Figure 1:
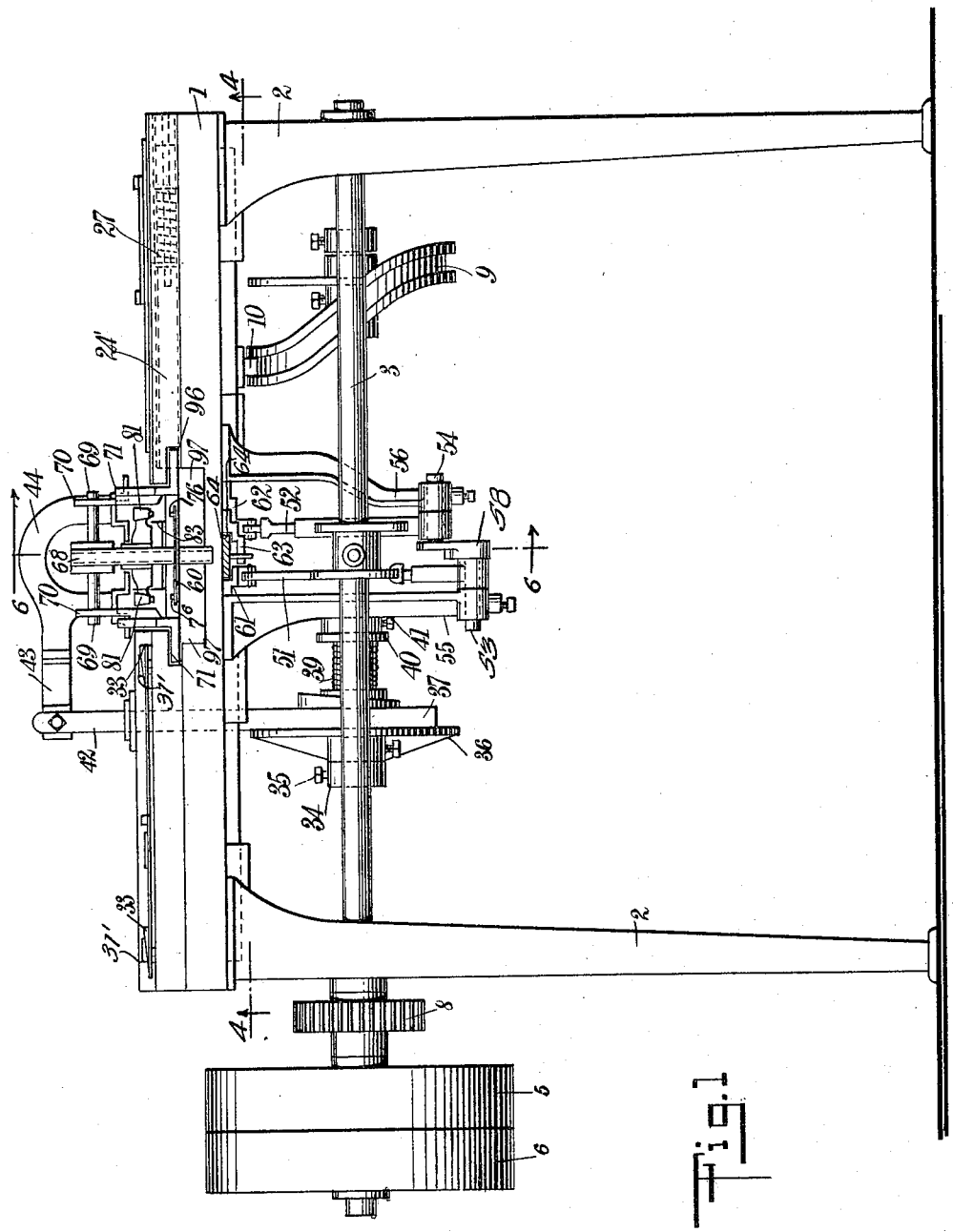

J. IBARRA.
MACHINE FOR CUTTING AND PASTING STAMPS TO CIGARETTE BOXES OR ANY OTHER PACKAGES.
APPLICATION FILED SEPT. 20, 1911.

1,130,517.

Patented Mar. 2, 1915.
13 SHEETS—SHEET 1.

WITNESSES

INVENTOR
José Ibarra
BY
ATTORNEYS

J. IBARRA.
MACHINE FOR CUTTING AND PASTING STAMPS TO CIGARETTE BOXES OR ANY OTHER PACKAGES.
APPLICATION FILED SEPT. 20, 1911.

1,130,517.

Patented Mar. 2, 1915.

13 SHEETS—SHEET 2.

WITNESSES

INVENTOR
José Ibarra
BY
ATTORNEYS

J. IBARRA.
MACHINE FOR CUTTING AND PASTING STAMPS TO CIGARETTE BOXES OR ANY OTHER PACKAGES.
APPLICATION FILED SEPT. 20, 1911.

1,130,517.

Patented Mar. 2, 1915.
13 SHEETS—SHEET 6.

WITNESSES

INVENTOR
Jose Ibarra
BY
ATTORNEYS

J. IBARRA.
MACHINE FOR CUTTING AND PASTING STAMPS TO CIGARETTE BOXES OR ANY OTHER PACKAGES.
APPLICATION FILED SEPT. 20, 1911.

1,130,517.

Patented Mar. 2, 1915.
13 SHEETS—SHEET 7.

WITNESSES

INVENTOR
José Ibarra
BY
ATTORNEYS

J. IBARRA.
MACHINE FOR CUTTING AND PASTING STAMPS TO CIGARETTE BOXES OR ANY OTHER PACKAGES.
APPLICATION FILED SEPT. 20, 1911.

1,130,517.

Patented Mar. 2, 1915.
13 SHEETS—SHEET 8.

WITNESSES

INVENTOR
José Ibarra
BY
ATTORNEYS

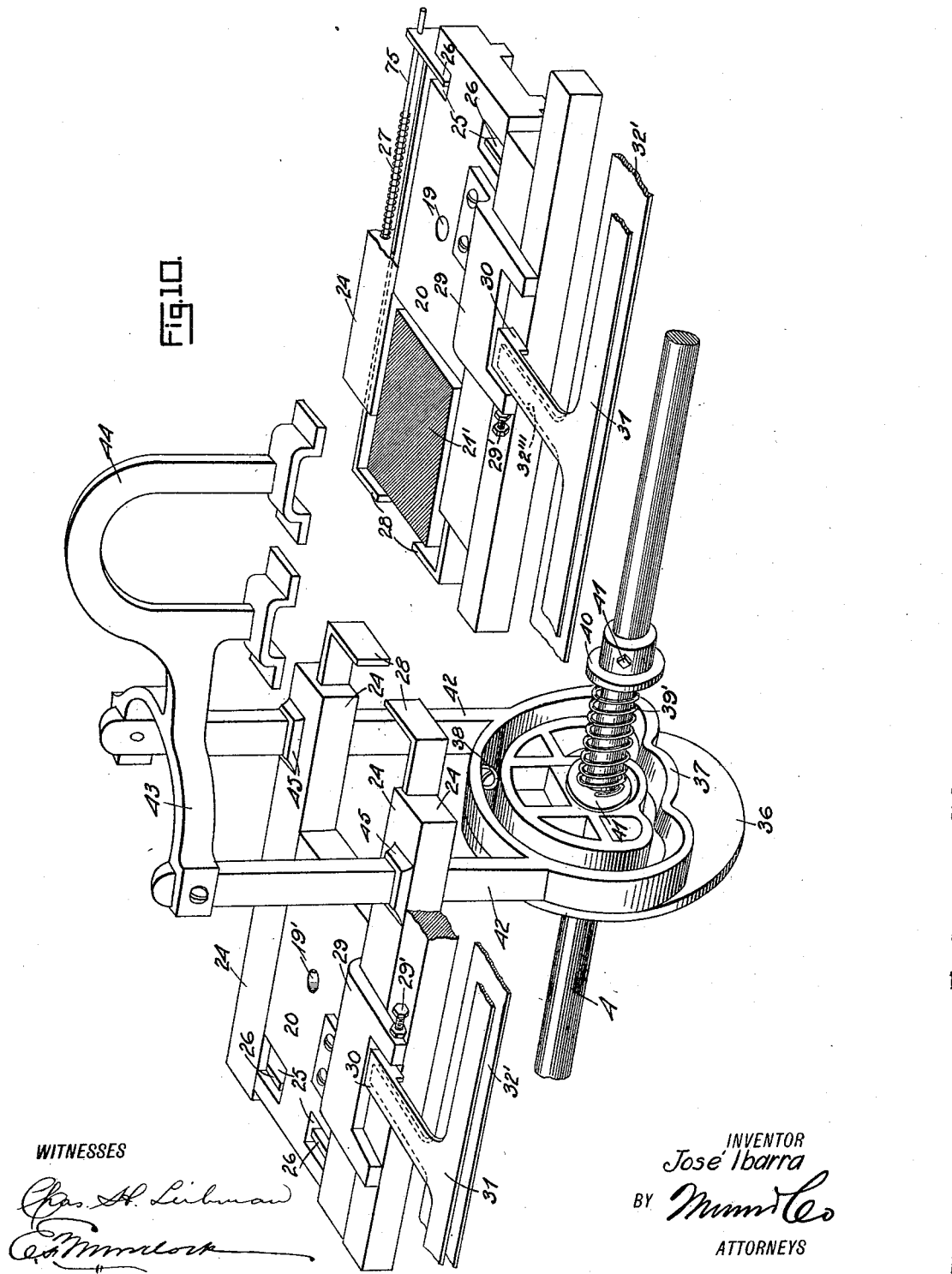

J. IBARRA.
MACHINE FOR CUTTING AND PASTING STAMPS TO CIGARETTE BOXES OR ANY OTHER PACKAGES.
APPLICATION FILED SEPT. 20, 1911.
1,130,517.
Patented Mar. 2, 1915.
13 SHEETS—SHEET 10.
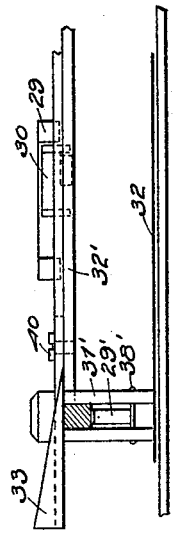
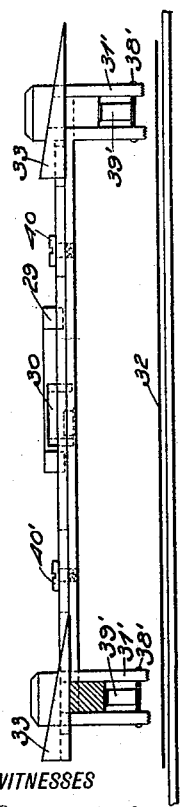
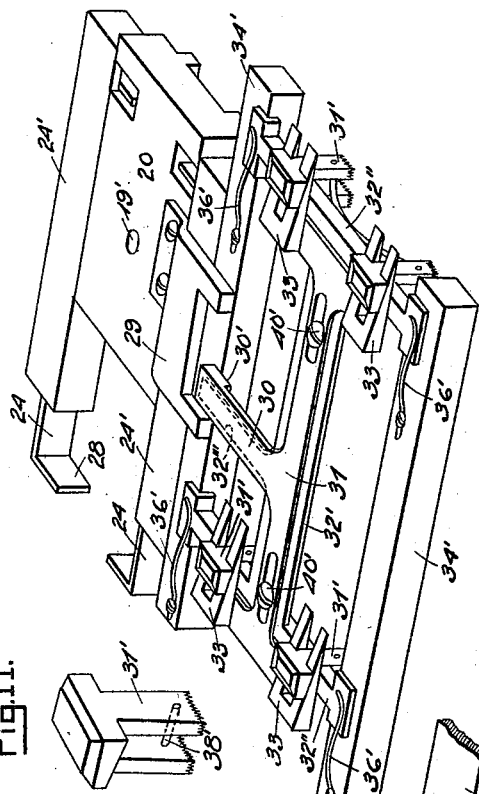
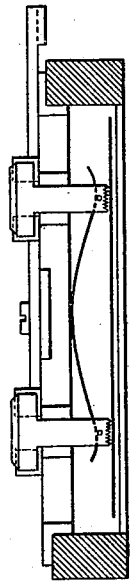
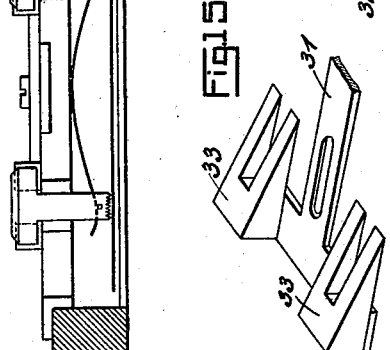
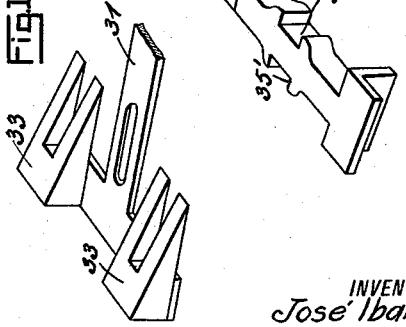
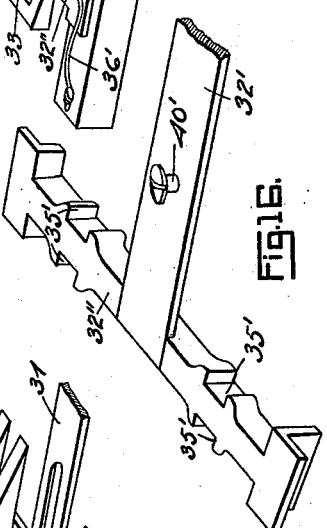
WITNESSES
INVENTOR
José Ibarra
BY
ATTORNEYS J. IBARRA.
MACHINE FOR CUTTING AND PASTING STAMPS TO CIGARETTE BOXES OR ANY OTHER PACKAGES.
APPLICATION FILED SEPT. 20, 1911.
1,130,517.
Patented Mar. 2, 1915.
13 SHEETS—SHEET 11.
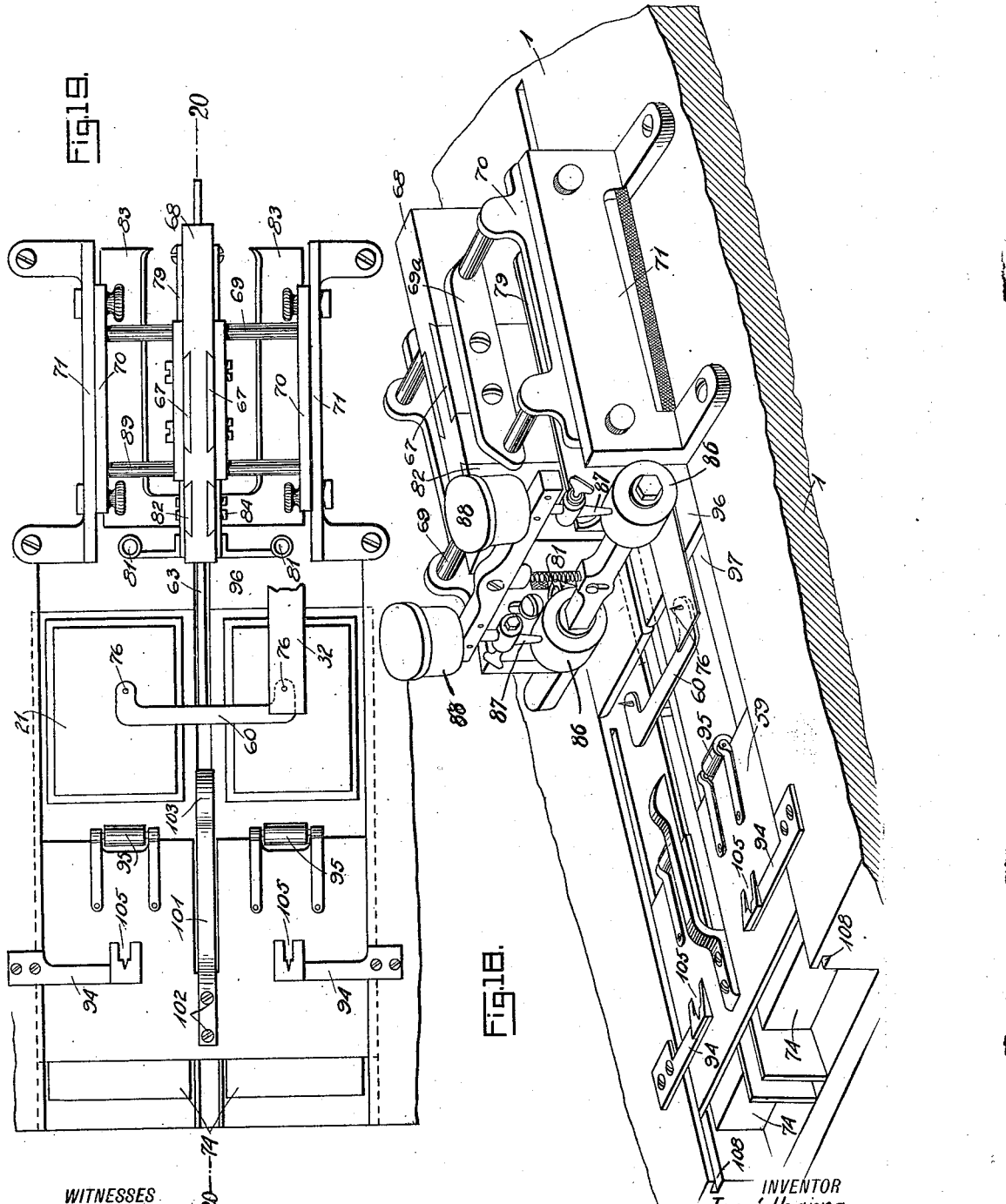
WITNESSES
INVENTOR
José Ibarra
BY 
ATTORNEYS

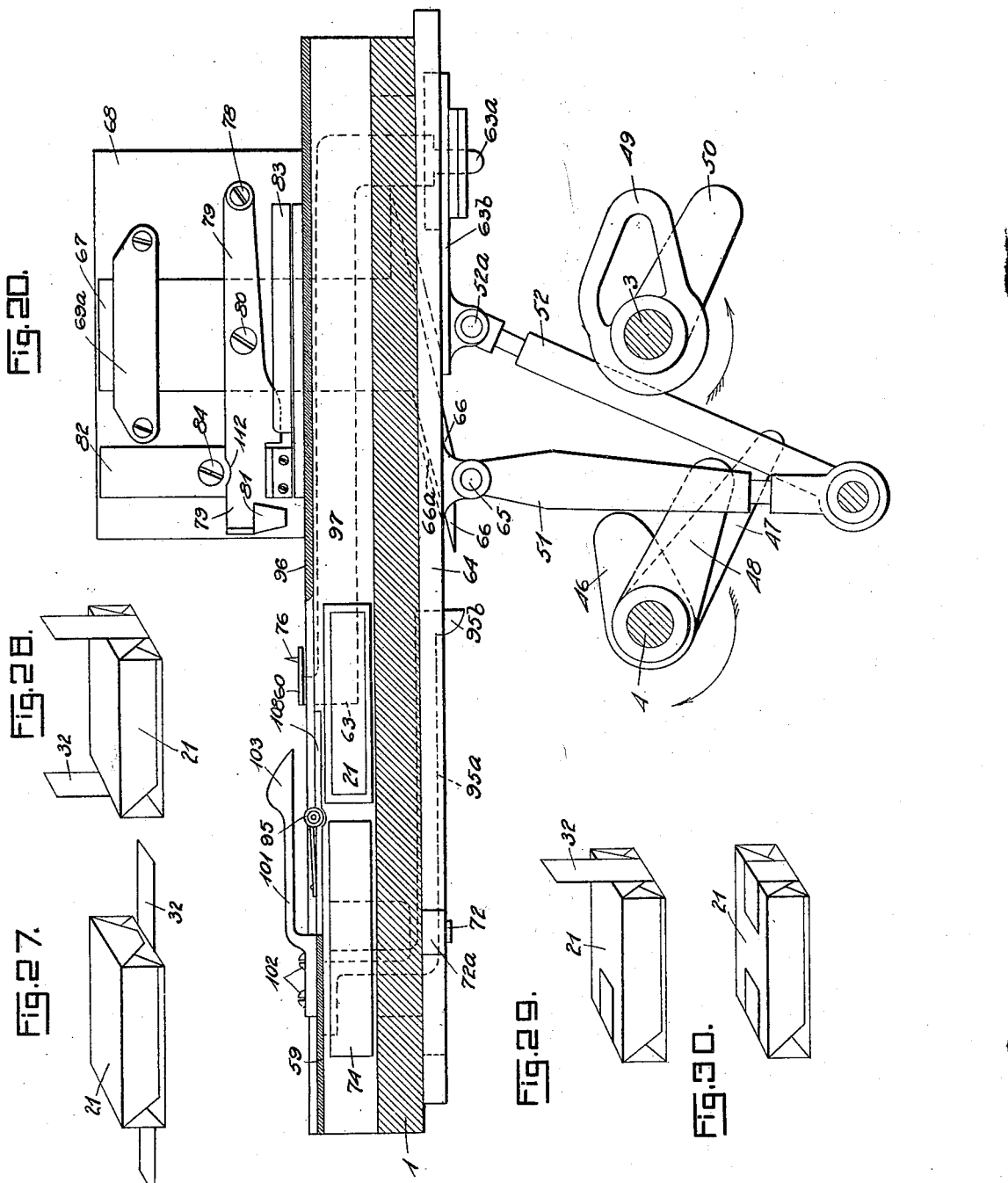

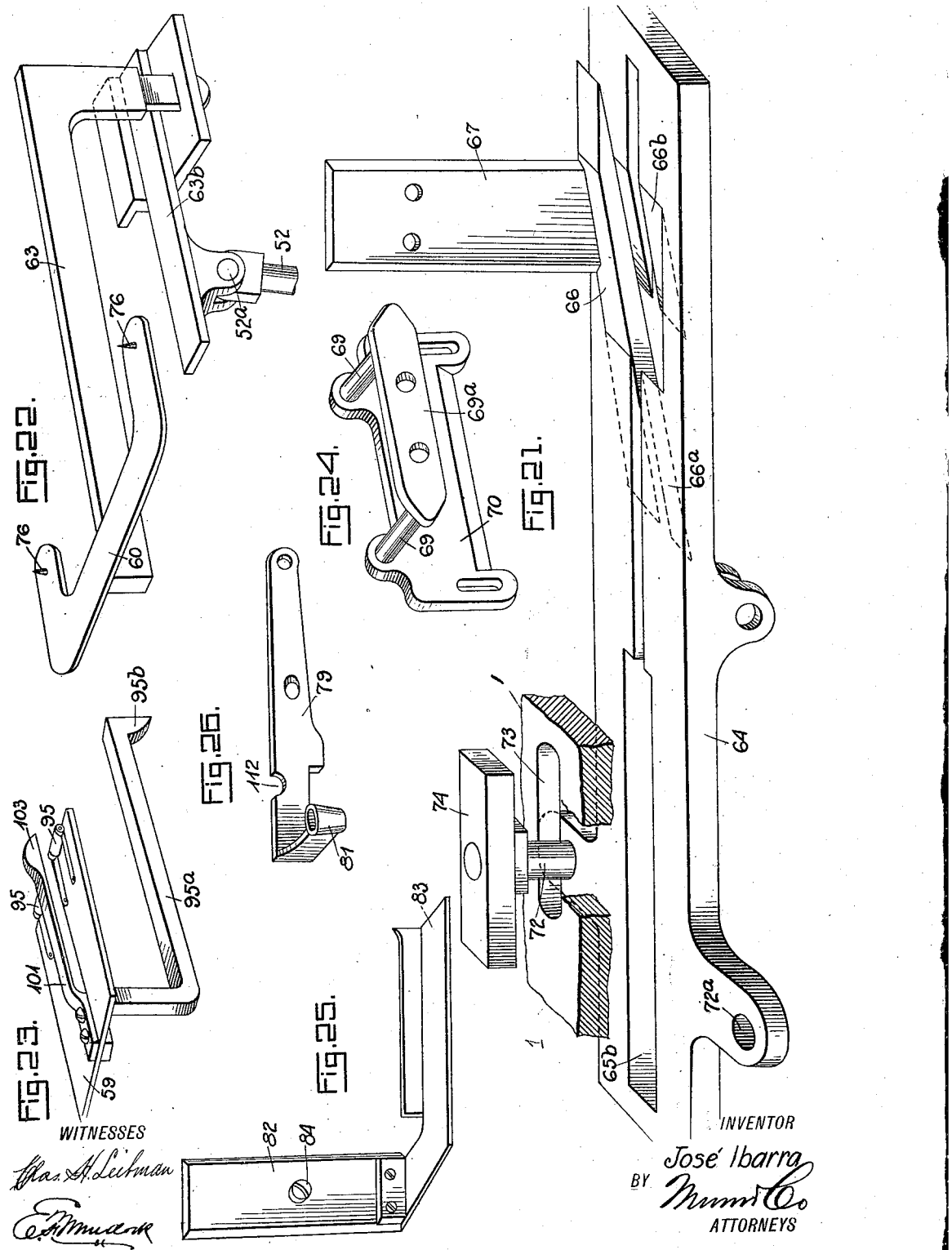

UNITED STATES PATENT OFFICE.

JOSÉ IBARRA, OF HABANA, CUBA.

MACHINE FOR CUTTING AND PASTING STAMPS TO CIGARETTE-BOXES OR ANY OTHER PACKAGES.

1,130,517.  Specification of Letters Patent.  Patented Mar. 2, 1915.

Application filed September 20, 1911. Serial No. 650,399.

*To all whom it may concern:*

Be it known that I, JOSÉ IBARRA, a citizen of the Republic of Cuba, and a resident of the city of Habana, Republic of Cuba, have invented a new and useful Machine for Cutting and Pasting Stamps to Cigarette-Boxes or any other Packages, of which the following is a full, clear, and exact description.

Among the principal objects which the present invention has in view are: to provide means for automatically delivering in separated condition boxes of the character mentioned into the path of stamps for enfolding said boxes, and means operating in correspondence with the box delivery for severing and delivering said stamps to an operating station, to be mechanically wrapped about, and caused to adhere to, each of the boxes at said station; to provide a machine wherein the above-stated means are multiplied and united to be operated by a common driving mechanism; and to provide means operable in correspondence with the aforesaid means for delivering the boxes after having the stamps applied thereto.

Figure 2:
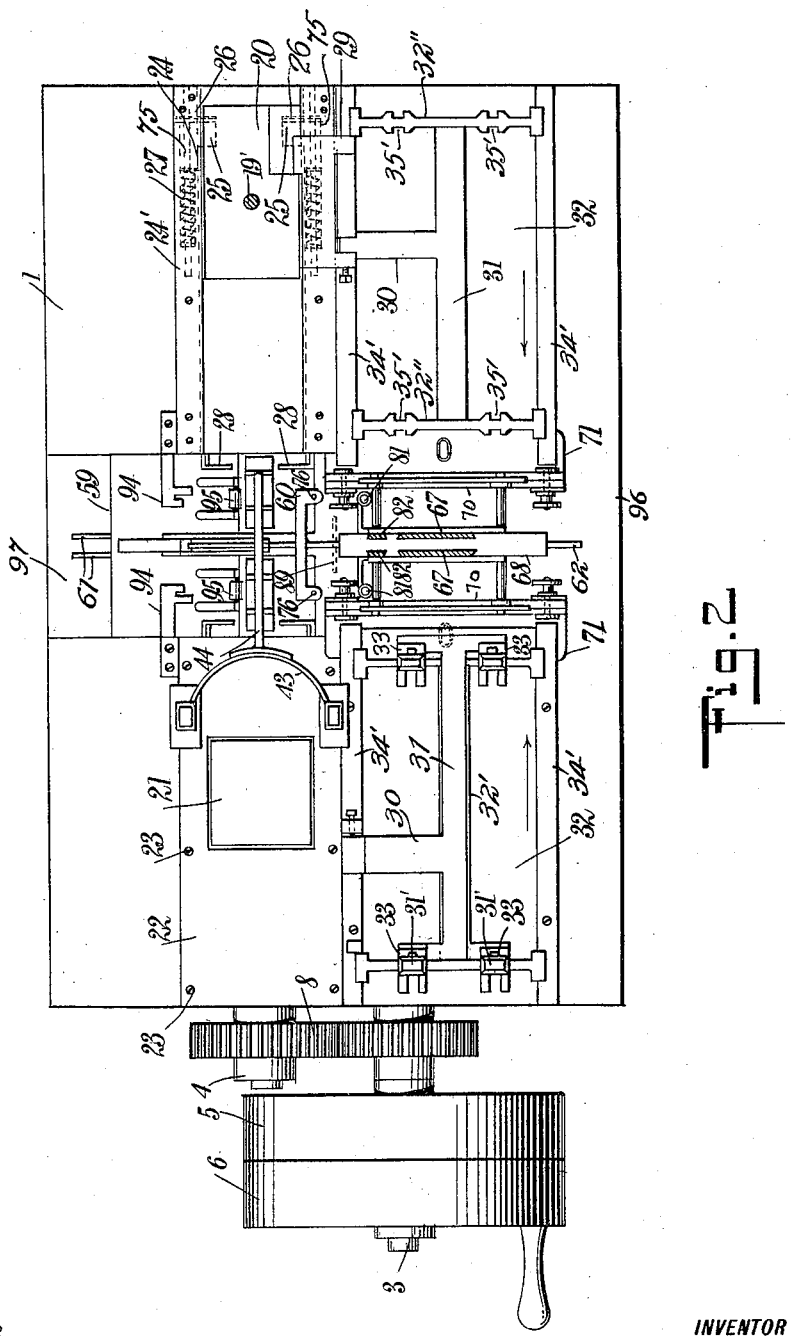
Figure 3:
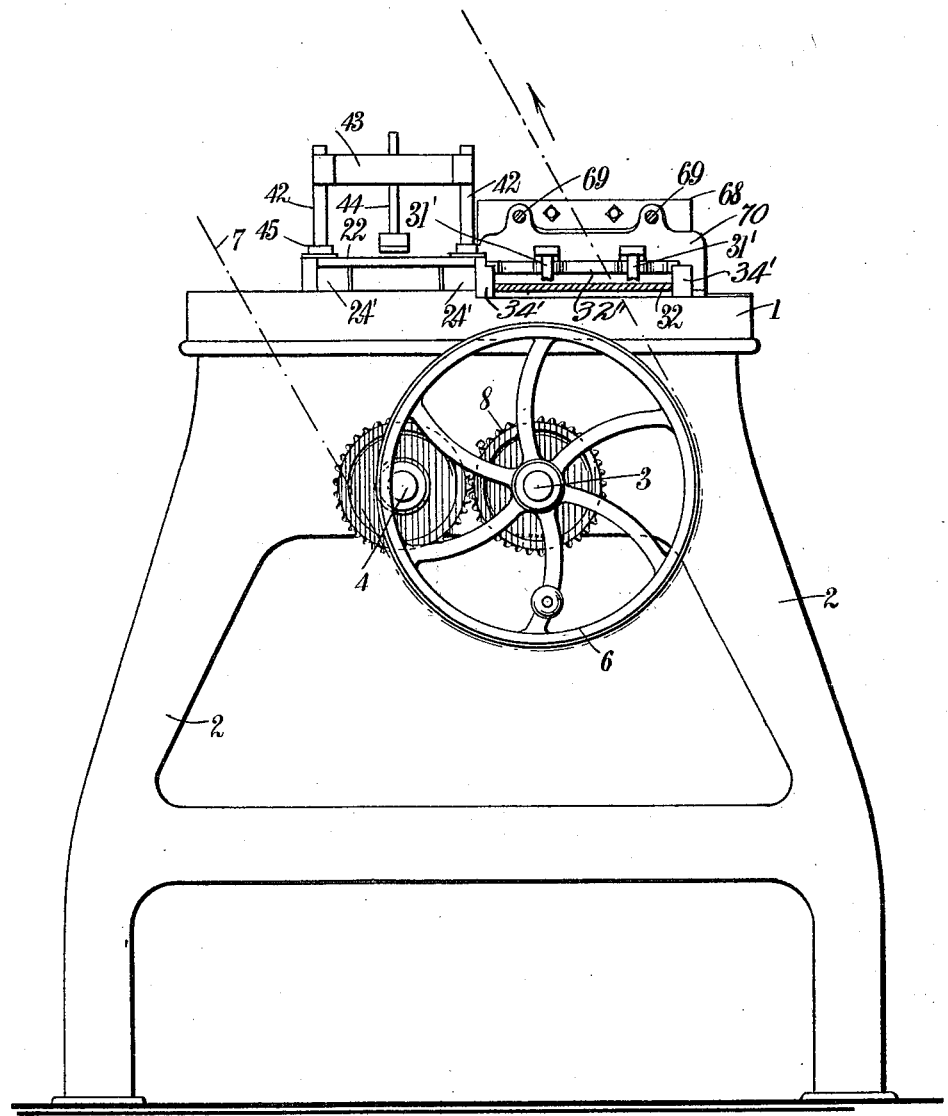
Figure 4:
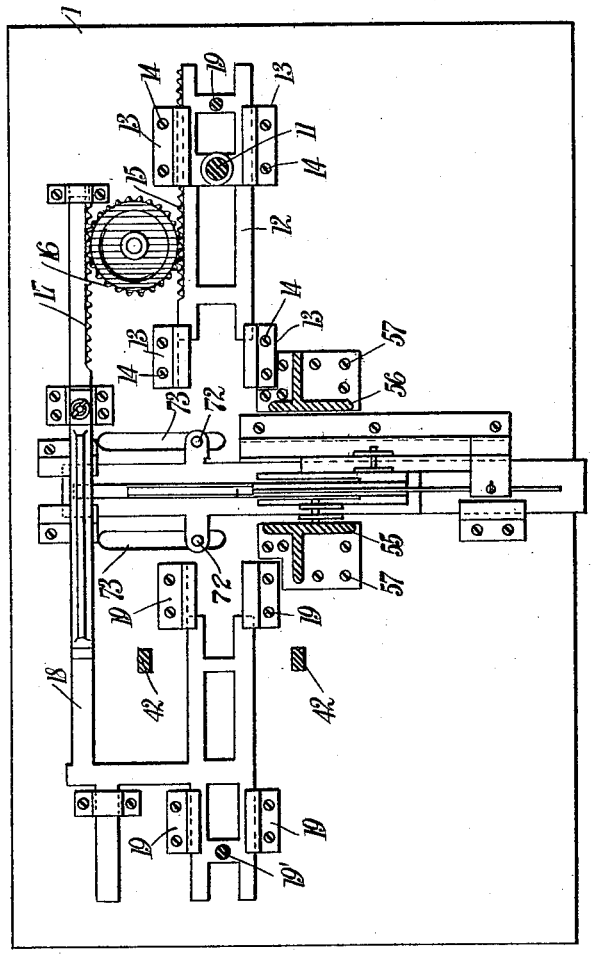
Figure 5:
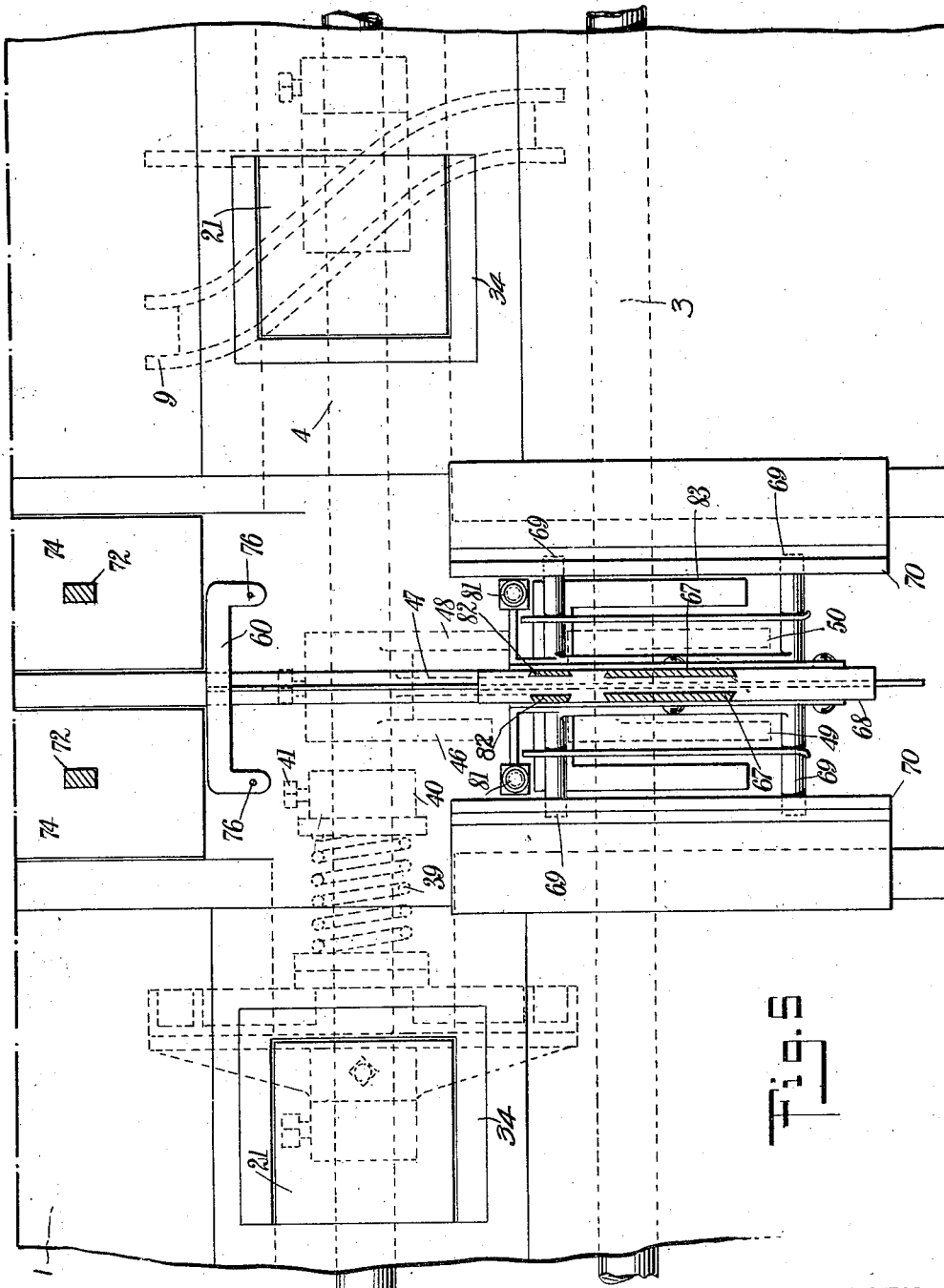
Figure 6:
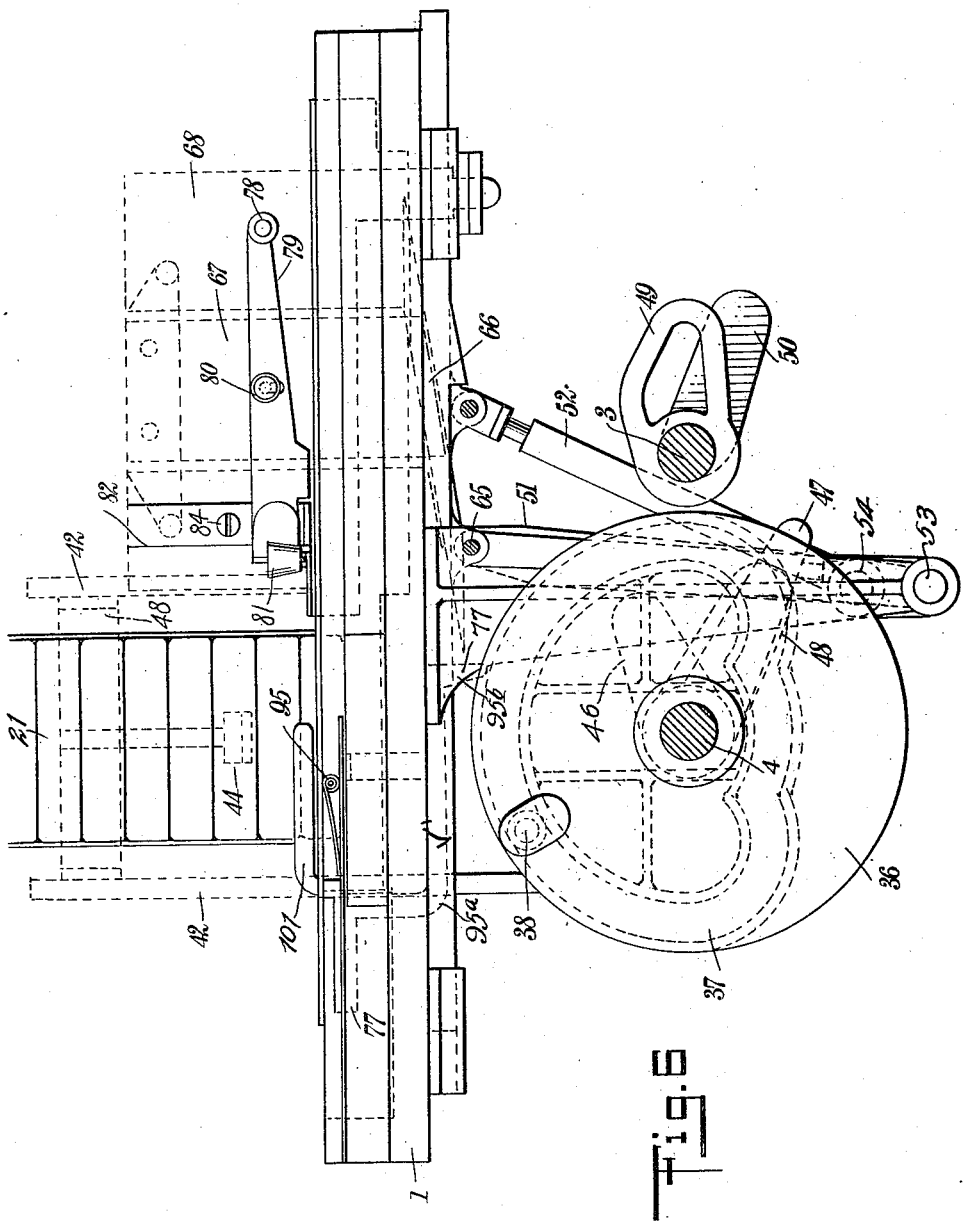
Figure 8:
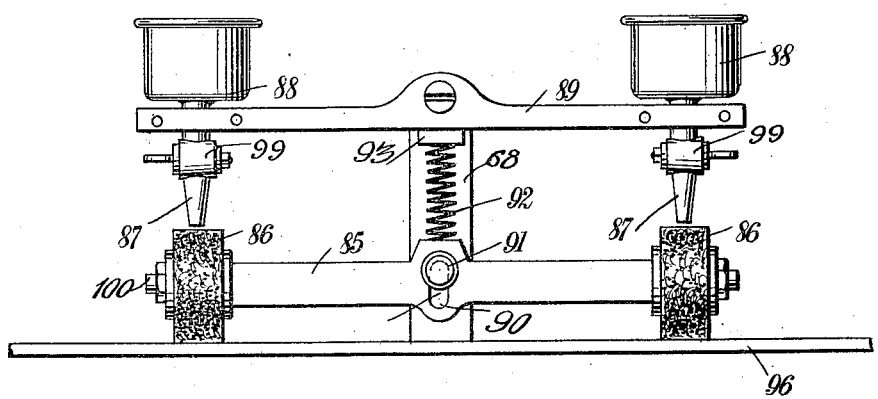
Figure 7:
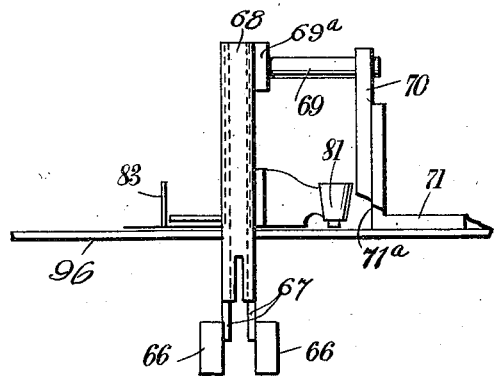
Figure 9:
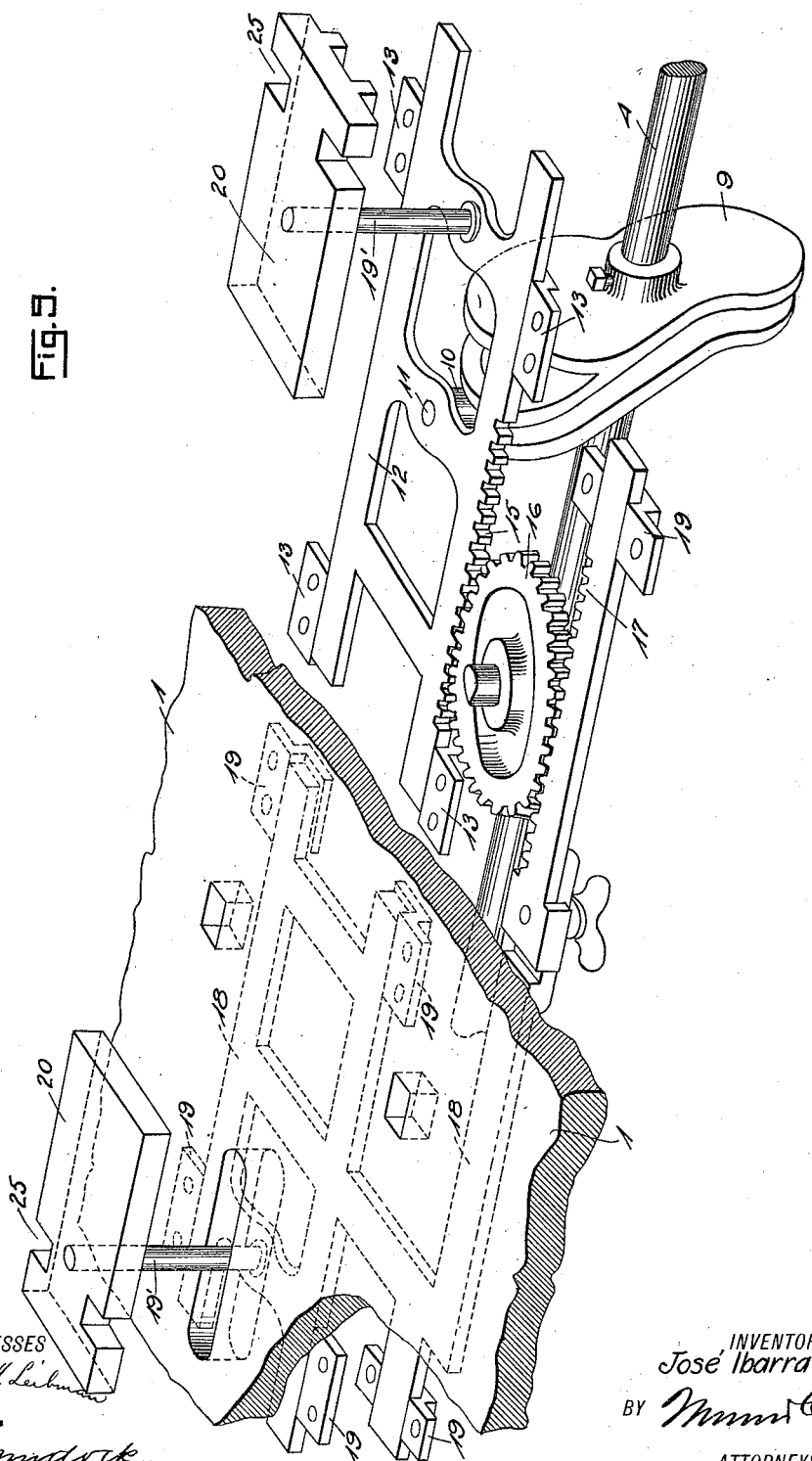

*Drawings.*—Figure 1 is an end elevation of a machine constructed and arranged in accordance with the present invention, the view being taken from the delivery end of said machine; Fig. 2 is a top plan view of said machine, portions of the upper members of the machine being removed at the right of the median line of said figure; Fig. 3 is a side elevation of the machine; Fig. 4 is a section taken on the line 4—4 in Fig. 1, the view being taken as seen from below; Fig. 5 is a top plan view on an enlarged scale, of a fragment of the machine, the view corresponding in position with that shown in Fig. 2 of the drawings; Fig. 6 is a vertical section on an enlarged scale, of a fragment of the machine, the section being taken as on the line 6—6 in Fig. 1; Fig. 7 is a detail view on an enlarged scale, showing a portion of the stamp-cutting apparatus with which the machine is provided; Fig. 8 is a detail view on an enlarged scale, showing the stamp-moistening apparatus with which the machine is provided; Fig. 9 is a perspective view showing a portion of the driving mechanism of the box-feeding mechanism with which the machine is provided; Fig. 10 is a perspective view of the upper portion of said box-feeding mechanism; Fig. 11 is a detail view in perspective, showing one of the drags with which the stamp-sheet feeding mechanism is provided; Fig. 12 is a side view of the stamp-sheet feeding frame, showing the drags in their inactive position; Fig. 13 is a similar view, partly broken away and showing a drag in active position; Fig. 14 is an end view of the feeding frame shown in Figs. 12 and 13; Fig. 15 is a perspective view showing in detail elevators for the drags employed in the stamp-sheet feeding frame; Fig. 16 is a perspective view showing in detail an end fragment of said feeding frame and a controlling slide bar for the drags employed thereon; Fig. 17 is a perspective view showing a fragment of the machine, illustrating the correlation of one of the box-feeding members and one of the stamp-sheet feeding frames; Fig. 18 is a perspective view of a central fragment of the operating table of the machine, showing portions of the stamp cutting, placing and folding mechanism, together with the box-receiving and delivering mechanism; Fig. 19 is a top plan view of the mechanism shown in Fig. 18; Fig. 20 is a vertical section taken as on the line 20—20 in Fig. 19; Fig. 21 is a detail view in perspective showing a portion of the elevating mechanism for the cutting blade of the stamp-shearing apparatus; Fig. 22 is a detail view in perspective showing the carrier provided for the stamps subsequent to their severance from the sheets; Fig. 23 is a detail view in perspective showing the stamp-laying plate for overturning one end of the stamp upon the box; Fig. 24 is a detail view in perspective of one of the stamp-shearing blades; Fig. 25 is a detail view in perspective, of one of the stamp-supporting tables; Fig. 26 is a detail view in perspective, of one of the elevating levers for the stamp-supporting tables and a stamp-setting ring attached thereto; Figs. 27, 28, 29 and 30 are perspective views of a box of the character mentioned and a stamp therefor, showing said stamp in the progressive stages of being placed upon said box.

*Description.*—The present machine is primarily designed to operate upon two supplies of boxes and stamps, and for this purpose, the table 1, which is supported on legs 2, is divided lengthwise by a channel 97. The channel 97 is divided lengthwise by partitions 61 and 62. The channel 97 is partly decked by a plate 96, as shown best in Figs. 18 and 19 of the drawings, the forward edge of which forms one boundary of the well into which the boxes 21 are delivered during the process of applying the stamps thereto. When the boxes are so delivered, the stamps are in the position shown best in Fig. 28 of the drawings. When each box is moved forward under the plate 96, the portion of the stamp upstanding at the forward end of the box is turned by said plate and forced upon the body of the box, to be adhered thereto.

As shown best in Fig. 5 of the drawings, two columns of boxes 21 are placed upon the table 1 within frames 34 surrounding openings formed in the plates 22, which plates are supported upon rails 24, to which they are secured by means of screws 23, as shown best in Fig. 2 of the drawings. The bottommost of each of the boxes 21 rests on the upper surface of the table 1, between the rails 24 and in the path of push-blocks 20, as best seen in Fig. 10 of the drawings. The push-blocks 20 are simultaneously advanced under the columns of boxes 21, engaging and carrying the lowermost of said boxes in advance of said push-blocks to positions above the channel 97. The boxes 21 are momentarily suspended above the channel 97, being held in this position by hook ended side bars 28. The side bars 28 have cross heads 26, one extension of which rests within the recesses 25. Extending through a perforation in the other flange of the heads 26 are guide rods 75, which are fixedly mounted in the rails 24 and support spiral compression springs 27. The forward ends of the bars 28 constitute the forward boundary of the pocket or recess for holding the lowermost of the boxes 21. When in the operation whereby the box is advanced by the push-blocks 20, the cross heads 26 are engaged by the springs 27, and retarded by the expansion thereof. The hook ends of the bars 28 are thus relatively drawn back against the box 21 to clamp the same lightly between said hook ends and the push-blocks 20. The clamping engagement thus obtained is sufficient to hold the boxes suspended above the channel 97 until displaced by the presser-feet at the end of the yoke arm 44.

The push-blocks 20 are made of sufficient length to rest below the column of boxes 21 to support the same while delivering a box therefrom to the position above described. The blocks 20 are operatively connected by means of short shafts 19', with sliding frames 12 and 18 respectively, as seen best in Fig. 9 of the drawings. The shafts 19' extend through slots suitably provided in the table 1. The frame 12 is slidably mounted in brackets 13, which are rigidly secured to the under side of the table 1. The frame 18 is similarly mounted in brackets 19, also rigidly secured to the table 1 and extending from the under side thereof.

Motive power is supplied to the frame 12 to reciprocate the same by a wabble grooved cam wheel 9. Into the groove of the wheel 9 extends a pin 10, the reduced end 11 of which is rigidly and fixedly connected to the frame 12, as shown best in Fig. 9 of the drawings. Motion is transmitted from the frame 12 to the frame 18 through a gear wheel 16, the teeth of which engage the teeth of a rack 15 on the frame 12 and the teeth of a rack 17 connected with the frame 18. The operative engagement thus effected between the frames 12 and 18 through the interposition of the wheel 16, insures an opposite synchronous reciprocation on the part of the two frames. The result of this action is that the two blocks 20 move back and forth synchronously to simultaneously deliver in suspension above the channel 97 two of the boxes 21. The brackets 13 are held in position by screws 14. When the boxes 21 are thus advanced by the blocks 20, they are each delivered directly above a stamp 32 which has been cut from a sheet indicated by the same number, as seen in Figs. 12 to 14 inclusive. These stamps 32 are held in position below the boxes 21 by a carrier 60, at the opposite ends whereof are upstanding pins 76, as best seen in Figs. 2, 18, 19 and 22 of the drawings.

The individual stamps 32 are severed from the stamp sheet 32 by means of shearing blades 70, prior to delivery to the carrier 60. The stamp sheets 32 are fed to the blades 70 by frames 32' and drags 31' loosely mounted thereon. To support the drags 31', a slide bar 32'' is provided with vertical grooves 35', in which the bifurcated extensions of the drags 31' rest.

The oppositely-positioned slide bars 32'' are rigidly connected by a frame 32'. The frame thus constructed slides reciprocatively on the rails 34', as best seen in Fig. 17 of the drawings. To engage the rails 34', the ends of the bars 32'' are rabbeted, as best shown in Fig. 16 of the drawings. The reciprocatory movement is imparted to the frame by a grid frame 31. The grid frame 31 has a cross bar at each end, and an extension arm 30 midway said bars. At both ends of each cross bar, a bifurcated cam 33 is provided, the sides whereof extend to each side of the bifurcated members of the drags 31', and under the heads of said drags. This is shown best in Fig. 17 of the drawings. The grid frame 31 rests above and slides on the frame 32', said grid frame having elongated slots to receive studs 40'. At the end of the arm 30, flanges 30' are depended to engage the arm 32''', and to permit a certain amount of lost motion therebetween.

As a result of the above-described construction, the arm 30 and grid frame 31 connected therewith are moved in advance of the arm 32''' and the frame 32' and parts connected therewith. The arrangement of the two frames and the drags 31' is such that when the frames are moved toward the channel 97 and the shearing blades 70, the cams 33 are drawn partly from beneath the heads of said drags, to permit the spring 39' to force said drags downward upon the stamp sheet 32, as seen best in Figs. 13 and 14 of the drawings. The free ends of the springs 39' rest upon pins 38', which extend between the bifurcated members of the drags 31'. To retard the action of the frame 32', the detent springs 36' are employed, said springs being secured permanently to the rails 34' with the free ends of the frames resting on the rabbeted ends of the slide bars 32''.

The lower extremities of the drags are serrated, as shown in Fig. 11 of the drawings. When the drag is permitted to rest on the sheet, the serrated extremities engage the stamp sheet 32 and move the same in correspondence with the movement of the frame 32'. The extent of the movement of the frame 32' equals the width of each of the individual stamps constituting the sheet 32. At the moment of movement of the stamps, the mechanism controlling the blades 70 has lifted said blades to permit the insertion below the same, of the stamp sheet 32 preparatory to severing the outermost of the stamps constituting said sheet.

As shown best in Figs. 10 and 17 of the drawings, the end of the arm 30 rests within an elongated recess formed in the edge of each of the bracket plates 29, which plates are rigidly secured to each of the blocks 20. When the ends of the plates 29 forming the recess at the edge thereof engage the arm 30, the grid frame 31 is moved in unison with the blocks 20 until the arm 32''' is engaged, after which the frame 32' and drags 31' are moved in unison with said blocks. The length of the recess in which the end of the arm 30 rests compensates for the proportionately greater movement of the blocks 20 and the boxes 21 carried thereby, as compared with the movement of the sheets 32. At one end of each recess is a screw bolt 29'. By manipulating the bolt 29' the relative movement of the plate 29 and the arm 30 may be varied to accommodate various widths of the stamps constituting the stamp sheets 32.

The action of the frames 12 and 18, as above described, is incident to the rotation of the wheel 9 and the countershaft 4. The countershaft 4 is driven from the main shaft 3 and at the same rate of rotation. The two shafts are operatively connected by transmission gears 8. Correspondence in action is thus secured between the shaft 4, the wheel 9 and cam arms 49 and 50 thereon, and the shaft 3 and the cam arms 46, 47 and 48 thereon. The relative disposition of the arms 46, 47, 48, 49 and 50 is shown best in Fig. 20 of the drawings. The dispositions of said arms are related to secure a timed grouped action with reference to the wheel 9 to operate in correspondence therewith. Thus, at the moment when the operation of the wheel 9 has resulted in advancing a box 21 to the suspended position thereof above the channel 97, the cam arm 50 will have moved the telescopic arm 52 backward to remove the carrier 60 beyond the path of the suspended position of said boxes.

The telescopic arm 52 is pivotally mounted on a short shaft 54. The shaft 54 is mounted in bearings between the lower end of a bracket 56 and a connecting link 58. The link 58 connects the adjacent ends of the short shaft 54 and a correspondingly short shaft 53 whereon is pivotally mounted the telescopic arm 51. The shaft 53 is in part supported by a bracket 55. The brackets 55 and 56 are suspended from the under side of the table 1 by means of screws 57. This structure is best seen in Figs. 1 and 4 of the drawings.

As seen best in Figs. 20 and 22 of the drawings, the arm 52 is pivotally connected by a pin 52$^a$ with a slide plate 63$^b$. The slide plate 63$^b$ is loosely connected with the reduced end 63$^a$ of an elbowed arm 63, at the rear end of which the carrier 60 is secured. The arm 63 operates in the space between the partitions dividing the channel 97 lengthwise of the machine, and through a short slot provided in the plate 96 to permit the ends of the carrier 60 which are provided with the pins 76, to extend below setting rings 81, the function of which rings is to force downward the end of the severed stamp 32 upon the pin 76 when juxtaposed thereto.

At the extreme rearward position of the carrier 60, the ends of the stamps engaged by the pins 76 pass over the wedges 105, which are shown best in Figs. 18 and 19 of the drawings. The wedges 105 are definitely located, being sustained in the path of the pins 76 by arms 94, the inner ends of said arms being securely fastened to the table 1. It will be noted that the stamps 32 have been drawn over rollers 95, which are mounted in yielding bearings on a slide plate 59. Coincident with the separation of the stamps from the pins 76 in the manner described, is the depression of the yoke arm 44 and the presser-feet carried thereby, which engage and force downward the boxes 21 into the channel 97 and out of engagement with the side bars 28, permitting thereby the springs 27 to readjust said side bars to their normal relation with the blocks 20. In thus moving the boxes 21, the stamp 32 is bent from the position as shown in Fig. 27 of the drawings to that shown in Fig. 28.

The yoke arm 44 is rigidly connected by a cross head 43 to standards 42. The standards 42 are slidably mounted in guide bearings 45 located adjacent the forward ends of the rails 24, as shown best in Fig. 10 of the drawings. Integrally connecting the lower ends of the standards 42 is a cam-grooved ring 37. Within the groove in said ring extends a pin 38, which is rigidly connected with a disk 36. The disk 36 is fixedly mounted on the shaft 4. The pin 38 is positioned on the disk 36 with reference to the operating moments of the arms 46 to 50 inclusive and of the wheel 9. Also, the groove in the ring 37 is shaped with reference to said operating moments, and to provide two cam rises and two cam levels of different lengths and at different distances from the center of the disk 36, said rises connecting said levels. Relatively considered, the cam level having the shorter radius is of a shorter length, corresponding with the duration of time at which the yoke arm 44 is in its lowered position, as when pressing the boxes 21 upon the bottom of the channel 97. The remainder of the groove corresponds with the duration of the time when the arm 44 is lifted to permit the successive advance and retreat of the carrier 60 and the plate 59, and the retreat and advance of the blocks 20, side bars 28 connected therewith, and the boxes held thereby. To retard the action of the ring 37, I provide a friction plate 41', which bears against, and tends to hold immovable, said ring 37. The plate 41' is forced against the side of the ring by the spring 39'. The spring 39' is held in position by a collar 40. The tension of said spring is varied by moving the collar 40 toward and away from the ring 37. The collar is held in adjusted position by a set screw 41.

The separated stamps 32 are severed from the stamp sheets 32 by the blades 70. The blades 70 are guided by face plates 71, through arches in the lower edges whereof the stamps are advanced into the path of said blades. The blades 70 are mounted on slide plates 67 by means of a cross bar 69ª and pins 69, as best shown in Figs. 18 and 19 of the drawings.

The slide plates 67 are each provided with inclined tongues 66, as best shown in Figs. 7 and 21 of the drawings. The tongues 66 extend through perforations provided in a slide plate 64, as shown by dotted lines in Fig. 20 of the drawings. Said perforations have upper and lower inclined walls 66ª and 66ᵇ, as shown in Fig. 21 of the drawings. The plate 64 is properly supported from the under side of the table 1 by blocks 74, the pintles 72 whereof extend through slots 73 formed in the table 1, and through the perforations 72ª in lugs projecting from the opposite sides of said plate 64, at the rear end thereof. The telescopic arm 51 is pivotally connected by means of a pin 65, which is extended through perforations in lugs 65ᶜ from the under side of said plate 64. The arm 51 is disposed in the path of the cam arm 46, to be operated upon thereby only as the shaft 4 is rotated. When operated upon by the cam arm 46, the arm 51 and plate 64 connected therewith are moved forward, and the upper inclined surface 66ª rides over the tongues 66, forcing the same downward, and simultaneously depressing the plates 67 and blades 70. It will be noted that the operation of the arm 46 is initiated in point of time subsequent to the initiation of the movement of the arm 48. Before the arm 48 has advanced the arm 52 and carrier 60 connected therewith to the end of their forward stroke, the arm 46 has moved the arm 51, plate 64 connected therewith, and push-blocks 74 attached to said plate, so that the box 21 is advanced under the plate 96, and the forward edge of the stamp 32, as shown in Fig. 29 of the drawings, is overlaid upon the box 21 in the position shown in Fig. 30 of the drawings. In this manner there is avoided the consequences which might arise from drawing the succeeding stamps over the moistened surface of the partially adjusted stamp.

At the extreme forward movement of the arms 46 and 51, the blocks 74 are advanced to place the stamped box 21 under the plate 96. The plate 64, arm 51, and blocks 74 are subsequently retracted to their normal or receiving position by the operation of the cam arm 49. It will now be noted that the cam arm 49 is arranged to operate on the arm 51 simultaneously with the operation of the cam arm 50 on the telescopic arm 52, the result of which combined action is to draw over the receiving position for the box 21 the last severed stamp 32, and to remove the blocks 74 from the path of the descending box 21.

By reference to Fig. 20 of the drawings, it will be observed that the arm 47 is in advance of the arms 48 and 46, respectively. The arm 47 engages in its rotation the lug 95ᵇ which extends from the elbowed arm 95ª. The elbowed arm 95ª is secured to the under side of the plate 59, as best seen in Fig. 23 of the drawings. The vertical extension of the arm 95ª extends upward through the slot formed in the plate 64, and upward between the perforations longitudinally dividing the channel 97. The edges of the plate 59 rest in grooves 108 in the sides of the channel 97 and adjacent the upper surface of the table 1, as seen best in Fig. 18 of the drawings.

Mounted upon the upper surface of the plate 59 are the rollers 95 and a reach bar 101, which is secured by screws 102 and has a wedge-shaped head 103. The office of the head 103 is to pass beneath the center of a spreader bar 85, at the ends whereof are rotatively mounted moistening wheels 86, as best shown in Fig. 8 of the drawings.

As a result of the arrangement of the arm 47 and the lug 95$^b$, the plate 59 with the rollers 95 and wedge head 103 are advanced over the box 21 before the carrier 60 or blocks 74 are moved forward by the cam arms 48 or 46. The rollers 95 thus overturn the standing portion of the stamp 32 at the rear of the box 21, placing the stamp in the position as shown in Fig. 29 of the drawings. At the end of its forward movement the head 103 lifts and maintains lifted the spreader bar 85, to permit the extension under the wheels 86 of the pins 76 on the carrier 60. When the carrier 60 is returned by the operation of the arms 50 and 52, it passes below the reach bar 101, engaging the same at the rear end thereof, and thereby moves the plate 59 backward to its normal position, the rear end of said reach bar being approximately in line with the wedges 105, as shown best in Fig. 18 of the drawings.

The individual stamps 32, when cut from the stamp sheet 32, are deposited on small shelves 83. The shelves 83 are rigidly connected to slide plates 82. The slide plates 82 are mounted in undercut grooves formed in a standard 68 which is rigidly mounted on the plate 96. The plates 82 are each provided with an extended screw 84, as seen best in Figs. 18 and 19 of the drawings. The screws 84 serve as handles, whereby the plates 82 are lifted. The screws 84 are engaged by arms 79, said arms being each provided with a notch 112 for this purpose.

The arms 79 are each pivotally mounted on screws 78, as best seen in Fig. 20 of the drawings. At the free ends of said arms, they are provided with setting rings 81. The arms 79 are also pivotally connected with the slide plates 67, screws 80 being employed for this purpose. It will be remembered that the cross bars 69$^a$ are secured to each of the plates 67, and support the shearing blades 70. It will also be remembered that the plates 67 are operatively connected with the plates 64, to be vertically reciprocated thereby. From the foregoing, it is obvious that when the plates 67 are elevated, the screws 80 rock the arms 79 to raise the free ends with the rings 81. The screws 84 are engaged by said arms, and the plates 82 are lifted to raise the shelves 83 under the overhanging individual stamps extending through the arches in the plates 71 and above the cutting edge 71$^a$ of the plates 71; see Fig. 7. It is while the plates 67 and 82 are raised that the previously-severed stamp 32 is drawn backward by the carrier 60, the pins 76 being released from engagement with the rings 81. It will be remembered that the carrier 60 and the severed stamps 32 engaged therewith have been removed from the shelf 83 and spread in the path of the descending boxes 21 prior to the retraction of the plate 64 and the descent of the plates 67 and blades 70. In this manner there is avoided any engagement on the part of the severed stamps.

As the stamps are drawn by the carrier 60 into the path of the descending boxes 21, they pass under the moistening wheels 86. The wheels 86 are rotatively mounted on the reduced ends of the spreader bar 85 and below drip-cocks 87 with which water cups 88 are provided. The spreader bar 85 is normally depressed by a spring 92. A screw 91 is extended through a slot 90 formed in the median section of said spreader bar to guide the operation of said spreader bar. The spring 92, at the upper end thereof, rests in a cup 93 on the under side of the framing bar 89 which supports the cups 88.

The machine is power-driven, a belt 7, shown best in Fig. 3 of the drawings, being mounted on the pulleys 5 and 6, one of which is an idler.

*Operation.*—Briefly described, the operation of the machine is as follows:—Before applying power to the shaft 3, the boxes 21 are stacked on the table 1, within the frames 34 on opposite sides of the channel 97. Normally the blocks 20 are retracted before starting the machine. After power is applied, the blocks 20 move forward, carrying the boxes 21 toward the channel 97, where they are held suspended by means of the side bars 28, the springs 27 retaining a grip on the boxes 21 to hold the same in suspended position. The yoke arm 44 is now depressed by the operation of the disk 36 and ring 37, the presser-feet on said yoke forcing the boxes 21 out of the grip of the blocks 20 and the side bars 28, to press the same upon the bottom of the channel 97, and upon the stamps 32 which were left in position when the machine was previously stopped. As the yoke arm 44 is elevated, the plate 59 with the rollers 95 and wedge head 103 is moved forward, the rollers 95 laying the rear ends of the stamps which are being adjusted to the boxes 21. After the rollers 95 have passed over said stamps and boxes, the blocks 74 and the carrier 60 are moved forward, the movement of the carrier 60 being initiated slightly in advance of the movement of the blocks 74. The wedge head 103, being slightly in advance of the carrier 60, raises the spreader bar 85 sufficiently to permit the pins 76 to pass under the wheels 86. The carrier is moved forward until the pins 76 rest below the rings 81 on the arms 79. Interposed between said rings and the pins 76 are the newly-severed stamps 32 intended for adjustment to the next succeeding boxes 21.

Coincident with the arrival of the carrier 60 to place the pins 76 under the rings 81, the plates 67 are depressed to lower the shearing blades 70 and the arms 79. This operation carries the rings 81 and stamps that rest on the shelves 83 down, causing the pins 76 to pierce the previously severed stamp, while placing the shelves 83 in position to receive the next succeeding severed stamp. Prior to the completion of the downward movement of the plate 67 and blade 70, the carrier 60 is retracted, removing from the shelves 83 the stamps engaged by said pins 76, thereby leaving said shelves free to receive the next severed stamp.

In advance of the blocks 74, the boxes 21 are pushed forward under the plate 96 through the channel for delivery at the far end of said plate 96, and at the far side of the machine or table 1. The forward edge of said plate lays the forward upstanding section of the stamps, folding the same over on the boxes 21 as they pass under said plate. Coincident with the advance of the boxes, the stamp sheets 32 are advanced. The drags 31' are raised and lowered in the manner above described, so that they engage said sheets when moving toward the blades 70, and are lifted above said sheets when moved backward therefrom. It will be understood that the series of operations of folding the stamps upon the boxes, and the series of operations resulting in delivering said boxes and stamps therefore, alternate. After the introduction of power to the machine, the operation thereof is automatic, there being left for the attendant only to supply the boxes 21 and stamp sheets 32, and to remove the stamped boxes from the delivery end of the machine.

Claims:

1. A machine as characterized, comprising a conveying mechanism operating intermittently from a receiving station toward a delivery station; a receptacle for holding boxes in column form; a receptacle for holding individual stamps associated in sheet form; means for transferring said boxes successively from said receptacle to said receiving station; means for separating said stamps successively; means for delivering said stamps in the path of said boxes intermediate said receptacle and said receiving station; means for folding the ends of said stamps over said boxes, embodying plates forming the boundaries of said receiving station, and means for disposing said plates in superposed and contactual relation with said boxes and interposed ends of said stamps; and means for moistening said stamps prior to delivery thereof in the path of said boxes.

2. A machine as characterized, comprising a conveying mechanism operating intermittently from a receiving station toward a delivery station; a receptacle for holding boxes in column form; a receptacle for holding individual stamps associated in sheet form; means for transferring said boxes successively from said receptacle to said receiving station; means for separating said stamps successively; means for delivering said stamps in the path of said boxes intermediate said receptacle and said receiving station; means for turning the ends of said stamps upward to surround the edges of said boxes, said means embodying plates forming the boundary of said receiving station; means for overturning one of the ends of each of said stamps, embodying rollers and means for advancing the same over said boxes and interposed ends of said stamps prior to the engagement of said boxes by said conveying mechanism; and means for moistening said stamps prior to delivery of the same in the path of said boxes.

3. A machine as characterized, comprising a conveying mechanism operating intermittently from a receiving station toward a delivery station; a receptacle for holding boxes in column form; a receptacle for holding individual stamps associated in sheet form; means for transferring said boxes successively from said receptacle to said receiving station; means for separating said stamps successively; means for delivering said stamps in the path of said boxes intermediate said receptacle and said receiving station; means for folding the ends of said stamps in parallel relation to the edges of said boxes and upon the upper side of said boxes successively, said means embodying a stationary plate and a movable plate, said plates forming the boundary of said receiving station; and an operating mechanism for said movable plate to move the same toward said delivery station, said stationary plate being adapted for extension above, while in contact with, said boxes and stamped ends interposed therebetween.

4. A machine as characterized, comprising a conveying mechanism operating intermittently from a receiving station toward a delivery station; a receptacle for holding boxes in column form; a receptacle for holding individual stamps associated in sheet form; means for delivering boxes successively from said receptacle to said receiving station, said means embodying a movable push-block operable in a plane coincident with the lowermost box of said column, a plurality of hook-ended side bars disposed in the same plane and in advance of said block, and yielding means for said side bars to normally hold the hook ends thereof at a distance from said blocks less than the width of said boxes; means for separating said stamps successively; means for delivering said stamps in the path of said boxes intermediate said receptacle and said receiving station; means for folding the ends of said stamps over said boxes after placement of said boxes at said receiving station; and means for moistening said stamps prior to delivery in the path of said boxes.

5. A machine as characterized, comprising a conveying mechanism operating intermittently from a receiving station toward a delivery station; a receptacle for holding boxes in column form; a receptacle for holding individual stamps associated in sheet form; means for delivering boxes successively from said receptacle to said receiving station, said means embodying a movable push-block operable in a plane coincident with the lowermost box of said column, a plurality of hook-ended side bars disposed in the same plane and in advance of said block, and yielding means for said side bars to normally hold the hook ends thereof at a distance from said blocks less than the width of said boxes; means for separating said stamps successively, said means embodying a feeding mechanism operating to deliver said sheets step by step toward the path of said conveying mechanism; means for delivering said stamps in the path of said boxes intermediate said receptacle and said receiving station; means for folding the ends of said stamps over said boxes after placement of said boxes at said receiving station; and means for moistening said stamps prior to delivery in the path of said boxes.

6. A machine as characterized, comprising a conveying mechanism operating intermittently from a receiving station toward a delivery station; a receptacle for holding boxes in column form; a receptacle for holding individual stamps associated in sheet form; means for delivering boxes successively from said receptacle to said receiving station, said means embodying a movable push-block operable in a plane coincident with the lowermost box of said column, a plurality of hook-ended side bars disposed in the same plane and in advance of said block, and yielding means for said side bars to normally hold the hook ends thereof at a distance from said blocks less than the width of said boxes; means for separating said stamps successively, said means embodying a feeding mechanism operating to deliver said sheets step by step toward the path of said conveying mechanism; means disposing said stamps in the path of said boxes after being separated from said sheets; means for folding the ends of said stamps over said boxes after placement of said boxes at said receiving station; and means for moistening said stamps prior to delivery in the path of said boxes.

7. A machine as characterized and a stamp-sheet feeding mechanism therefor, comprising a supporting table; a frame superposed thereover; a plurality of drags vertically slidable in said frame, said drags having each a friction engaging surface at the ends adjacent said table; an auxiliary frame slidably mounted on the first-mentioned frame to operatively engage the same with a predetermined lost motion; a plurality of wedges mounted upon said superposed frame, adapted to engage said drags, for lifting the same; a plurality of push-blocks for delivering boxes successively to a conveyer in a path parallel with the path of said frames; and a recessed plate to engage said superposed frame, said recess providing for motion of said blocks in excess of that imparted to said frames.

8. A machine as characterized and a stamp-sheet feeding mechanism therefor, comprising a supporting table; a frame superposed thereover; a plurality of drags vertically slidable in said frame, said drags having each a friction engaging surface at the ends adjacent said table; an auxiliary frame slidably mounted on the first-mentioned frame to operatively engage the same with a predetermined lost motion; a plurality of wedges mounted upon said superposed frame, adapted to engage said drags, for lifting the same; a plurality of push-blocks for delivering boxes successively to a conveyer in a path parallel with the path of said frames; a recessed plate to engage said superposed frame, said recess providing for motion of said blocks in excess of that imparted to said frames; and means structurally connected with said plate for varying the amount of movement of said plate prior to engaging said frame.

In testimony whereof I have signed my name to this specification in the presence of two subscribing witnesses.

JOSÉ IBARRA.

Witnesses:
 HENRY V. PLANETT,
 A. ROGERS.